(No Model.)
G. R. CULLINGWORTH.
OUTLET VALVE FOR AIR COMPRESSORS.
No. 287,005. Patented Oct. 23, 1883.
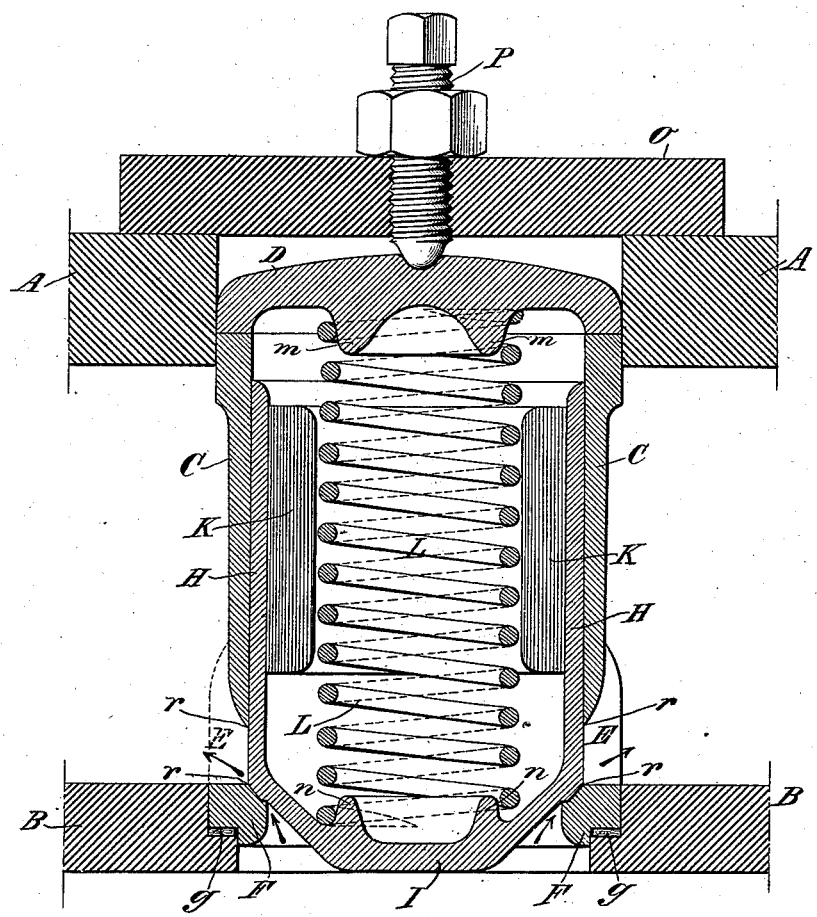
Witnesses:
Ed. L. Moran
Fred Hayner
Inventor:
George R. Cullingworth
by his Attorneys
Brown & Brown

UNITED STATES PATENT OFFICE.

GEORGE R. CULLINGWORTH, OF NEW YORK, N. Y.

OUTLET-VALVE FOR AIR-COMPRESSORS.

SPECIFICATION forming part of Letters Patent No. 287,005, dated October 23, 1883.

Application filed January 16, 1883. (No model.)

*To all whom it may concern:*

Be it known that I, GEORGE R. CULLINGWORTH, a citizen of the United States, residing in the city, county, and State of New York, have invented a new and useful Improvement in Outlet-Valves for Air-Compressors, of which the following is a specification.

This invention consists in the novel construction of an outlet-valve for an air-compressor and in the application within it of a spring for closing it, whereby the spring is supported and guided effectively and a free opening is left between the valve and its seat unobstructed by the valve-guides or spring-supports.

The accompanying drawing represents a longitudinal section of my improved outlet-valve and connections with the valve closed.

A is the outer wall of the discharge-air chamber, and B is the inner wall of the same, which is also the wall of the cylinder. The valve-casing is composed of a hollow cylindrical sleeve, C, closed at its top by a cap, D, wing-like supports E connecting the lower end of the sleeve C to the inner wall of the air-chamber, and the seat-ring F, upon which the bottom of the valve rests when it is closed, the said ring and cylindrical sleeve presenting an annular opening, r r, between them. This ring F may be packed in place upon the inner wall of the air-chamber by a gasket or packing-ring, g.

The valve proper is composed of a hollow cylindrical body, H, with a closed bottom, I, and fitting into the sleeve C of the valve-seat to slide up and down within the same. The inner circumference of the body H has affixed to it a ring or bushing, K, as a longitudinal guide for the valve-spring L. This bushing is made of wood or material lighter than the rest of the valve, in order that it will not unnecessarily load the valve. The cap D of the valve-seat and the bottom I of the valve are provided, respectively, upon their inner sides with annular flanges m n, for the purpose of forming bearings for the ends of the spring L and preventing them from being displaced. The spring L is inclosed within the valve and valve-seat, extending their entire length, and is held and guided by the flanges and bushing above named.

O is a bonnet, which rests upon the outer wall, A, of the air-chamber. A screw, P, passes through the said bonnet, and the end of the screw presses upon the cap D, and thereby secures the valve-seat in place, and the pressure on the valve being outward the said bonnet cap and screw also serve to hold the valve in place against the pressure of the air. The bonnet O may be made large enough to be used for several valves, or each valve may have its own bonnet. In either case there must be a screw, P, for every valve.

What I claim as my invention, and desire to secure by Letters Patent, is—

1. The valve-casing composed of a hollow cylinder, C, and a seat-ring, F, connected therewith by supporting-wings E, so as to leave an annular space between them, the cap D, screw P, and bonnet O, with the inner and outer walls of the discharge-air chamber, substantially as herein described.

2. The combination, with a hollow cylindrical discharge-valve for an air-compressor, of a closing spring placed within the said valve and guided externally by the interior of a guide provided within the valve, substantially as herein described.

3. The combination, with a hollow cylindrical discharge-valve of an air-compressor, and the casing containing the seat for said valve, and a cap or cover to said casing, of a spring-guide bushing within the said valve and a spiral spring arranged within the said valve and said guide-bushing and having its ends fitted to bearings in the said valve and cap, substantially as and for the purpose herein described.

G. R. CULLINGWORTH.

Witnesses:
  FREDK. HAYNES,
  ED. L. MORAN.